Oct. 15, 1940.   E. P. SUNDHOLM   2,218,363
GREASE GUN
Filed Nov. 9, 1939
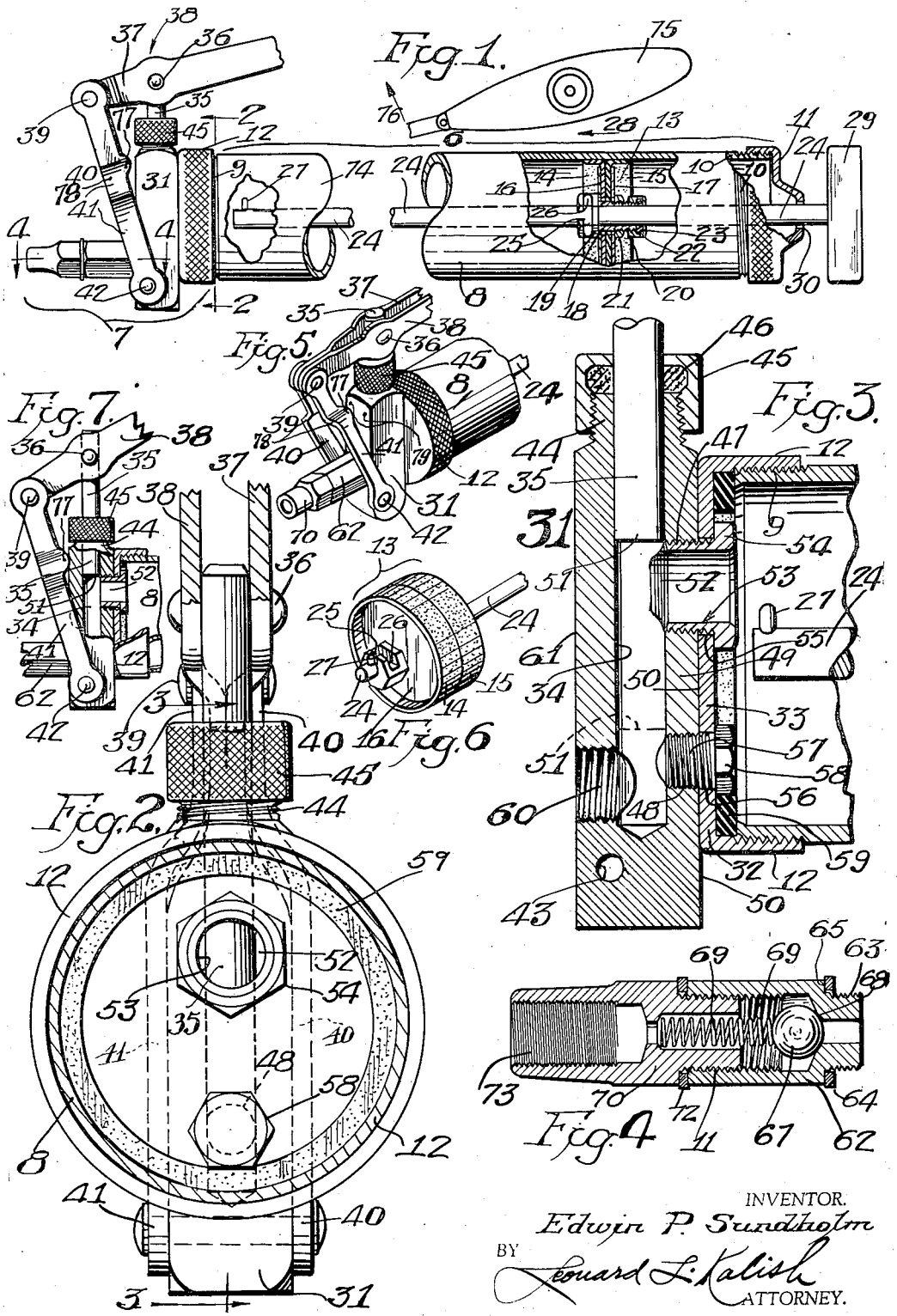
INVENTOR.
Edwin P. Sundholm
BY Leonard L. Kalish
ATTORNEY.

Patented Oct. 15, 1940

2,218,363

UNITED STATES PATENT OFFICE 2,218,363

GREASE GUN

Edwin P. Sundholm, Albert City, Iowa

Application November 9, 1939, Serial No. 303,657

4 Claims. (Cl. 221—47.3)

The present invention relates to certain new and useful improvements in grease guns, and it relates more particularly to certain new and useful improvements which render the grease gun more effective and more efficient in actual operation.

In the accompanying drawing, in which like reference characters indicate like parts, Figure 1 represents a side elevational view of a grease gun embodying the present invention, with parts broken away and sectioned so as to expose to view the internal construction thereof.

Figure 2 represents an elevational view of the "head" or high-pressure pump part of the grease gun embodying the present invention, on a somewhat enlarged scale, viewed generally on line 2—2 of Figure 1.

Figure 3 represents a section on line 3—3 of Figure 2.

Figure 4 represents a section on line 4—4 of Figure 1 on the same scale as that shown in Figures 2 and 3.

Figure 5 represents a perspective view of the head of the grease gun.

Figure 6 represents a perspective view of the front end of the sleeve 18 and slotted head 19 forming part of the piston 13.

Figure 7 represents a fragmentary cross-sectional view of a head of the grease gun shown with the piston fully retracted.

The grease gun is composed of two major portions, to wit, the grease reservoir, or what is sometimes called the "barrel" or "cylinder" of the grease gun and the associated parts thereof, which is in the drawing collectively identified by the numeral "6," and the high-pressure pump portion, or what is sometimes called the "head" of the grease gun, and its associated parts, which are in the drawing collectively referred to by the numeral 7.

The reservoir or "cylinder" 6 of the grease gun includes a cylindrical grease container 8 threaded at both ends as at 9 and 10 respectively, either externally or internally according to the manner in which it is desired to telescope the ends of the cylinder 6 in relation to the rear gap or terminal member 11 and in relation to the coupling portion or flange 12 of the "head" 7 of the grease gun.

The cylinder 8 contains a piston assembly designated generally by the numeral 13, which is formed of two oppositely extending cup-shaped retainer or combination washers 14 and 15 arranged back to back, and whose flat portions are braced by metal washers 16 and 17; all having a central hole through which a generally tubular metallic sleeve 18 is extended. The outer end of the sleeve 18 is provided with an enlarged head 19 at one end and is threaded externally as at 20 at its other end threadedly to receive the retaining nut 21 and also the cup-like stuffing gland 22 which retains some suitable compressible packing ring 23 to seal against the side wall of the operating rod 24 which extends through the sleeve 18.

The nut 21 is tightened until it firmly clamps the two metallic washers 16 and 17 and the two leather cup washers 14 and 15 into a unit as indicated in the drawing; the enlarged head 19 serving as an abutment in such clamping arrangement.

The enlarged head 19, which may be hexagonal, is provided with a slot 25 parallel to the axis and a slot 26 extending therefrom laterally in each direction transversely of the axis. The inner end of the operating rod 24 is provided with a laterally extending pin 27 which is adapted to enter the axial slot 25 and may then be caused to enter the transverse slot 26 in either direction by a slight turning of the rod, thereby to engage the piston assembly 13, so as to permit the piston assembly to be urged forwardly in the direction of the arrow 28.

The pin 27 may also serve as means for engaging a shut-off valve and for rotationally operating the shut-off valve in a gun-filling grease-dispensing device by which the cylindrical reservoir 8 may be filled from time to time. For the more convenient reciprocation and rotation of the operating rod 24, both for manipulating the piston assembly 13 as well as for manipulating the shut-off in the gun-filling grease-dispensing device, a handle 29 is preferably provided at the outer end of the rod which extends through the terminal member or cap member 11; the latter being provided with a hole 30 for that purpose which, in the form of construction shown, clears the rod sufficiently to permit free access of air behind the piston assembly 13.

The "head" 7 of the grease gun is formed of a high-pressure cylinder block 31, which is preferably formed of a square cold rolled steel bar, and the cup-like barrel-receiving member 32 pressed out of a piece of flat sheet steel and including the flat end wall 33 and the cylindrical flange portion 12 which is either internally or externally threaded to receive the threaded end 9 of the cylindrical reservoir 8.

The high-pressure cylinder block 31 is drilled and reamed from one end to provide a cylindrical bore 34, within which the ground steel piston 35 is disposed and is adapted to reciprocate. The upper end or outer end of the piston 35 is drilled transversely to receive the pivot pin 36. The drilled outer end of the piston 35 is flanked on opposite sides by the two flat steel handle lever bars 37 and 38; the pivot pin 36 extending through said handle lever bars 37 and 38 and through the piston 35 to form a pivoted connection therebetween and is preferably riveted on its outer ends to prevent dislodgment.

The short ends of the handle lever bars 37 and 38 are firmly pivoted at 39 to a pair of linked bars 40 and 41, which flank said ends and which also flank cylinder block 31, and the lower ends of which are pivoted to the lower end of the cylinder block by a pivot pin 42 which extends through a hole 43 in the cylinder block 31.

The upper end of the cylinder block 31 is turned down to a reduced cylindrical portion 44, which is externally threaded, threadedly to receive the cup-like stuffing gland 45 which is adapted to compress a suitable annular packing material 46 to seal against the side wall of the piston 35.

The cylinder block 31 is provided with two threaded openings 47 and 48, both extending inwardly through the side wall 49 of the cylinder block 31 and at a right angle to the flat face 50 of the cylinder block and at right angle to the axis of the cylinder block. The threaded hole 47 is just below the end 51 of the piston 35 in the uppermost or retracted position of its path of travel, which is shown in solid line in Figure 3, while the threaded hole 48 is just below the lowermost limit of travel of the end 51 of the piston 35, which in Figure 3 is shown in dotted lines.

The upper threaded opening 47 is sufficiently large to permit the threaded reception of a tubular intake port bolt or sleeve 52 whose bore or inner diameter 53 is at least as large and preferably larger than the diameter of the cylinder bore 34 of the cylinder block 31. The sleeve 52 is externally threaded and is provided with a lateral flange 54, the outer periphery of which is preferably polygonal, as for instance hexagonal as indicated in Figure 2, so as to permit it to be engaged by a wrench or equivalent appliance. The cup-like steel member 32 is provided with an opening 55 in alignment with the threaded opening 47 and of a size just sufficient to permit the free passage therethrough of the threaded portion of the sleeve 52.

The cup-like steel barrel receiving member 32 is also provided with a lower opening 56 therethrough of a diameter just sufficient to receive the threaded shank of a headed bolt 57 having a hexagonal or other suitable head 58.

If desired, any suitable caulking or sealing compound may be applied between the flat surface 50 of the steel cylinder block 31 and the outer flat surface of the end wall 33 of the cup-like barrel-receiving member 32, as for instance, white lead or other caulking or packing or sealing compound. Thereafter, the tubular port bolt 52 and the solid bolt 57 are fastened in place through the aligned openings, thereby firmly uniting the cup-like barrel-receiving steel shell 32 with the steel cylinder block 31. The tubular port bolt 52 as well as the solid bolt 57 are also preferably formed of steel.

An annular gasket 59 of any suitable oil resistant material, such as leather of oil resistant composition, is placed within the cup-like barrel-receiving member 32 to seal against the end of the reservoir cylinder 8 in the manner indicated in Figure 3.

At a point also below the lowermost point of travel of the end 51 of the piston 35, a threaded opening 60 is extended through the side wall 61 of the cylinder block 31 to serve as a discharge opening. Into the threaded opening 60, a tubular check valve housing 62 is threadedly secured by means of the threaded end 63 thereof. The tubular check valve housing 62 is also preferably formed of a hexagonal steel bar drilled out in the manner indicated particularly in Figure 4 and reduced and threaded as at 63. A suitable metallic gasket, such as a copper gasket 64 is interposed between the shoulder 65 of the valve housing 62 and the flat surface 61 of the cylinder block 31 to form a seal.

The ball check valve 67 is seated against the valve seat 68 by means of a spring 69. The spring 69 is held in place by the bushing 70 which is threaded into the outer end of the valve housing 62 as at 71, and is sealed thereagainst by an annular metallic sealing gasket 72 of copper or the like. The outer end of the bushing 70 is threaded as at 73 to receive any discharge holes or other conduit. The end of the bushing 70 which telescopes into check-valve housing 62 is preferably slotted across slightly to interrupt the continuity of the edge of the hole therein, so as to prevent the ball 67 from forming a fluid seal with such edge if pressed thereagainst by the flow of discharging grease; particularly very viscous or heavy grease.

By making the diameter of the bore 53 of the tubular port bolt 52 at least as large or preferably larger than the diameter of the cylinder bore 34 into which it leads, the effectiveness and efficiency of the grease gun, particularly for viscous and stringy greases, is greatly increased. One of the difficulties encountered in the effective use of grease guns of the type here shown is that the heavy viscous greases, and particularly certain greases having a stringy or fibre-like consistency, will not respond to the suction created within the bore 34 of the pump cylinder block 31 when the piston 35 is retracted to the position shown in Figure 3, because the amount of suction created is dependent, among other things, upon the diameter of the cylinder bore 34 or of the piston 35. Thus, I have found that by making the inner bore 53 of the tubular port bolt 52 at least as large or larger than the suction-creating diameter of the cylinder bore 34, which is to draw the grease through the port bore 53, the movement of even the heaviest and stringiest greases through the port bore 53 can be efficiently effected without a breaking of the vacuum. Thus, whereas it has heretofore been believed than an increase in the diameter of the inlet port tends to depreciate the inflow of grease through the port into the high-pressure cylinder under the influence of the suction created by the retraction of the piston, because the enlargement of the inlet port reduces the effective stroke of the high-pressure piston (for any given actual piston travel), I have found that the sacrifice of effective piston stroke is more than compensated for by the material reduction and the time required for the grease to flow into the high-pressure cylinder. Thus, it seems that the vacuum created by the retraction of the high-pressure piston 35 is rapidly dissipated and its effectiveness impaired unless the grease quickly responds to the available vacuum by quickly flowing into the high-pressure cylinder when the piston has been retracted, so that instead of relying on a relatively higher vacuum, which could be obtained for the same piston displacement by a reduction of the diameter of the inlet port, I have enlarged the inlet port as shown. By this means, I have found that the most viscous and stringiest greases can be effectively handled.

In the operation of the grease gun, the cylindrical reservoir 8 is first filled with grease. To fill the cylindrical reservoir with grease, the reservoir 8 is unscrewed from the "pump head." The follower piston assembly 13 is brought to the front end 74 of the reservoir 8 by means of the rod 24. Thus, the rod 24 is retracted until the pin 27 thereof enters the axial slot 25 in the head 19 of the piston bushing 18 and the rod is then turned in either direction to enter one of the undercut ends of the transverse slot 26. Then the rod 24 is advanced by means of a handle 29 in the direction of the arrow 28 until the follower piston assembly 13 is brought to the front end 74 of the reservoir cylinder 8.

Thereupon, the front end 74 may be dipped into a pool or mass of grease as it is received in the drum or original container, and the rod 24 withdrawn by means of the handle 29 in relation to the reservoir cylinder 8 while the front end 74 thereof is still submerged in the grease. This causes the grease to be sucked into the reservoir cylinder 8 as the piston 13 is retracted by the rod 24 until the reservoir is filled. The reservoir cylinder 8 may also be filled more conveniently by applying the threaded end 9 thereof to a gun-filling grease-dispensing device such as that shown in my co-pending applications Serial Nos. 236,281, 303,655, 303,658 and 319,836.

After the reservoir cylinder 8 has been filled the threaded end 9 thereof is telescoped and threaded to the cup-like barrel-receiving member 32 of the "head" 7 of the grease gun and tightened into place against the sealing gasket 59. Thereupon, the piston 35 is fully retracted by raising the handle 75 upwardly in the direction of the arrow 76. While the handle is so raised, the follower piston 13 is pressed against the end of the grease column in the reservoir cylinder 8 by means of the operating rod 34 and handle 29 (while the pin 27 is still engaged in the slot 26), thereby to compact the grease column against the end wall 33 of the cup-like barrel-receiving member 32 and thereby also to press the grease end fully into the port bore 53 and possibly the cylinder bore 34, or at least to press the grease sufficiently against the port member 52, so that on the successive strokes of the piston 35, the grease will be sucked into and thereafter expelled from the cylinder bore 34 through the discharge opening 60 and the valve housing 62. After the flow of grease has been so initiated through the pump, the manual pressure on the column of grease in the reservoir cylinder 8 may be omitted and the rod 24 released from axial engagement with the piston 13 and may be telescoped into the reservoir cylinder 8 into the position shown in Figure 1, thereby reducing the overall length of the grease gun while in operation. Thus, once the flow of grease has been started, the operating rod 24 and handle 29 need no longer be used or manipulated in the operation of the grease gun. These parts thus need not be again used or manipulated until it is necessary to refill the grease gun in the manner hereinabove indicated.

In the preferred embodiment of the present invention, the links 40 and 41 are provided with stop projections 77 preferably at the point 78 where the links are bent inwardly or where they are offset; said stop projections 77 being in alignment with the areas 79 of the flat wall 61 of the cylinder block 31. The stop projections 77 are so proportioned that when they contact the areas 79 on the surface 61 (see Figure 5) the piston 35 will be in the retracted position shown in Figures 3 and 7. By this means, not only is the upper limit of the piston accurately determined, but all wedging and jamming of the links 40 and 41 against the cylinder block 31 is avoided.

By this construction, any extreme angularity of the force of the lever handle on the piston during the end of the up stroke or retracting stroke is avoided, and by this means the undue wear between piston and cylinder bore due to such extreme angularity is also avoided or minimized.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed as new and desired to be secured by Letters Patent is:

1. In a grease gun, a pumping head including a steel cylinder block having a cylinder bore, a piston in said cylinder bore, and a pressed-steel cup-like barrel-receiving socket secured to said cylinder block generally at a right angle thereto by means of a tubular port bolt positioned at least partly beneath the retracted position of the piston and by means of a solid bolt spaced from said tubular bolt in the direction of the advanced position of the piston; the port opening through said tubular port bolt being of a diameter at least as great as the diameter of the cylinder bore in said cylinder block.

2. In a grease gun, a pumping head including a steel cylinder block having a cylinder bore, a piston in said cylinder bore, and a pressed-steel cup-like barrel-receiving socket secured to said cylinder block generally at a right angle thereto by means of a tubular port bolt positioned at least partly beneath the retracted position of the piston and by means of a solid bolt spaced from said tubular bolt in the direction of the advanced position of the piston; the port opening through said tubular port bolt being of a diameter substantially greater than the diameter of the cylinder bore in said cylinder block.

3. A grease gun including a reservoir barrel, a pumping head at one end of said reservoir barrel including a cylinder block and a cup-like barrel-receiving socket disposed generally at a right angle thereto, a piston in said cylinder block, an operating lever pivotally secured to the outer free end of said piston at a point spaced inwardly from both ends of said lever, a link pivotally secured to the cylinder block near the end thereof opposite to the end from which the piston projects, said link having its opposite end pivoted to the end of said operating lever and having a stop projection intermediate the ends thereof in operative alignment with the surface of said cylinder block adapted to abut thereagainst in the uppermost position of said piston.

4. A grease gun including a reservoir barrel, a pumping head, the one end of said reservoir barrel including a steel cylinder block and a pressed-steel cup-like barrel-receiving socket secured thereto generally at a right angle thereto, a piston in said cylinder block, an operating lever pivotally secured to the outer free end of said piston at a point spaced inwardly from both ends of said lever, a pair of similar links pivotally secured to the cylinder block near the end thereof opposite to the end from which the piston projects, said links having their opposite ends pivoted to the end of said operating lever, said links being offset towards each other at a point intermediate the ends thereof, stop portions provided at the offset zone of said levers in operative alignment with a surface of said cylinder block adapted to abut thereagainst in the uppermost position of said piston.

EDWIN P. SUNDHOLM.